(12) United States Patent
Dai et al.

(10) Patent No.: US 10,939,195 B2
(45) Date of Patent: Mar. 2, 2021

(54) SOUND ABSORBING MATERIAL AND SPEAKER BOX USING SAME

(71) Applicant: AAC Acoustic Technologies (Shenzhen) Co., Ltd., Shenzhen (CN)

(72) Inventors: Jiqiang Dai, Shenzhen (CN); Hezhi Wang, Shenzhen (CN); Hongshu Feng, Shenzhen (CN); Guochuang Huang, Shenzhen (CN); Kun Tang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/522,687

(22) Filed: Jul. 26, 2019

(65) Prior Publication Data
US 2020/0037062 A1  Jan. 30, 2020

(30) Foreign Application Priority Data
Jul. 28, 2018 (CN) .......................... 201810849593.7

(51) Int. Cl.
| | | |
|---|---|---|
| B01J 29/068 | (2006.01) | |
| H04R 1/28 | (2006.01) | |
| H04R 1/02 | (2006.01) | |
| C01B 39/06 | (2006.01) | |
| C01B 39/48 | (2006.01) | |
| B01J 29/072 | (2006.01) | |
| B01J 29/44 | (2006.01) | |
| B01J 29/68 | (2006.01) | |
| B01J 29/46 | (2006.01) | |
| B01J 29/40 | (2006.01) | |
| B01J 29/67 | (2006.01) | |
| B01J 29/70 | (2006.01) | |
| B01J 29/76 | (2006.01) | |

(Continued)

(52) U.S. Cl.
CPC ............ *H04R 1/2803* (2013.01); *B01J 20/18* (2013.01); *B01J 20/186* (2013.01); *B01J 20/2803* (2013.01); *B01J 20/28004* (2013.01); *B01J 20/28007* (2013.01); *B01J 29/068* (2013.01); *B01J 29/072* (2013.01); *B01J 29/405* (2013.01); *B01J 29/44* (2013.01); *B01J 29/46* (2013.01); *B01J 29/67* (2013.01); *B01J 29/68* (2013.01); *B01J 29/7057* (2013.01); *B01J 29/7084* (2013.01); *B01J 29/7415* (2013.01); *B01J 29/7469* (2013.01); *B01J 29/7615* (2013.01); *B01J 29/7669* (2013.01); *B01J 29/87* (2013.01); *B01J 29/88* (2013.01); *B01J 29/89* (2013.01); *B01J 35/023* (2013.01); *B01J 37/0009* (2013.01); *B01J 37/0072* (2013.01); *B01J 37/031* (2013.01); *B01J 37/30* (2013.01); *C01B 39/06* (2013.01); *C01B 39/065* (2013.01); *C01B 39/082* (2013.01); *C01B 39/087* (2013.01); *C01B 39/36* (2013.01); *C01B 39/38* (2013.01); *C01B 39/44* (2013.01); *C01B 39/46* (2013.01); *C01B 39/48* (2013.01); *H04R 1/025* (2013.01); *B01J 2229/183* (2013.01); *B01J 2229/186* (2013.01); *B01J 2229/42* (2013.01); *C01P 2002/72* (2013.01); *C01P 2004/03* (2013.01); *C01P 2004/61* (2013.01)

(58) Field of Classification Search
CPC ...... B01J 29/068; B01J 29/072; B01J 29/405; B01J 29/44; B01J 29/46; B01J 29/67; B01J 29/68; B01J 29/7415; B01J 29/7469; B01J 29/7057; B01J 29/7615; B01J 29/7669; B01J 29/7084; B01J 29/88; B01J 29/87; B01J 29/89; B01J 2229/183; B01J 2229/186; B01J 2229/42; B01J 20/2803; B01J 20/28007; B01J 20/28004; B01J 20/18; B01J 20/186; B01J 35/023; B01J 37/0009; B01J 37/0072; B01J 37/30; B01J 37/031; C01B 39/06; C01B 39/082; C01B 39/087; C01B 39/36; C01B 39/38; C01B 39/44; C01B 39/46; C01B 39/48; C01B 39/065; H04R 1/288; H04R 1/2803; C01P 2002/60; C01P 2002/72; C01P 2004/03; C01P 2004/60; C01P 2004/61
USPC ........ 502/60, 61, 64, 66, 69, 71, 73, 74, 77, 502/400, 406, 407; 423/700, 713
See application file for complete search history.

(56) References Cited

U.S. PATENT DOCUMENTS

| | | | |
|---|---|---|---|
| 9,597,661 B2 * | 3/2017 | Blakeman | F01N 3/2066 |
| 2010/0063341 A1 * | 3/2010 | Heng | C10G 11/10 585/651 |

(Continued)

FOREIGN PATENT DOCUMENTS

WO  WO 2014/036289  * 3/2014

*Primary Examiner* — Elizabeth D Wood
(74) *Attorney, Agent, or Firm* — W&G Law Group LLP

(57) ABSTRACT

The present disclosure provides a sound absorbing material. The sound absorbing material comprising a heteroatom zeolite molecular sieve comprising a framework and an extra-framework cation, the framework comprising $SiO_2$ and a metal oxide $M_xO_y$ comprising a metal element M, wherein the framework has a molar ratio of Si/M between 250 to 500, wherein the M includes Fe, and that the extra-framework cation is at least one of a monovalent copper ion, a monovalent silver ion, a monovalent gold ion, an alkali metal ion or an alkaline earth metal ion. The sound absorbing material provided by the present disclosure, sound absorbing material to have better oxygen adsorption capacity, good waster repellency and stability. When such a sound absorbing material is applied to a speaker box, the speaker box will have better low frequency acoustic performance and better reliability.

10 Claims, 4 Drawing Sheets

(51) Int. Cl.
*B01J 29/74* (2006.01)
*B01J 29/88* (2006.01)
*B01J 20/28* (2006.01)
*B01J 29/87* (2006.01)
*B01J 29/89* (2006.01)
*B01J 35/02* (2006.01)
*B01J 37/30* (2006.01)
*B01J 37/00* (2006.01)
*B01J 20/18* (2006.01)
*C01B 39/44* (2006.01)
*B01J 37/03* (2006.01)
*C01B 39/36* (2006.01)
*C01B 39/46* (2006.01)
*C01B 39/38* (2006.01)
*C01B 39/08* (2006.01)

(56) References Cited

U.S. PATENT DOCUMENTS

| | | | |
|---|---|---|---|
| 2012/0207669 A1* | 8/2012 | Naraki | B01D 53/9418 423/702 |
| 2013/0170687 A1* | 7/2013 | Papakyriacou | B01J 20/183 381/338 |
| 2014/0064540 A1* | 3/2014 | Lin | H04R 1/2803 381/346 |
| 2014/0186244 A1* | 7/2014 | Blakeman | B01J 29/7615 423/213.5 |
| 2015/0068402 A1* | 3/2015 | Lin | C08J 9/40 96/153 |
| 2015/0104364 A1* | 4/2015 | Elomari | B01D 53/9418 423/212 |
| 2016/0127812 A2* | 5/2016 | Papakyriacou | B01J 20/2808 381/338 |
| 2016/0318299 A1* | 11/2016 | Arai | C09D 11/10 |
| 2018/0167721 A1* | 6/2018 | Feng | C01B 39/46 |

* cited by examiner

SOUND ABSORBING MATERIAL AND SPEAKER BOX USING SAME

FIELD OF THE DISCLOSURE

The present disclosure relates to a sound absorbing material, and more particularly to a sound absorbing material applied in speaker box and a speaker box using the same.

DESCRIPTION OF RELATED ART

With the rapid development of electronic information technology, speakers are applied in more and more electronic products as the sounding components, such as mobile phones, notebooks and the like. However, with the advancement of technology, electronic communication equipments are becoming more and more miniaturized, and which further constrains the resonance space of the speaker boxes. Therefore, the air absorption and desorption effect thereof can increase air compliance, thereby reducing the resonant frequency of the speaker and playing an equivalent effect of virtually increasing the resonant space.

In a related art, a speaker box comprises a speaker and a cavity filled with a sound absorbing material, wherein the sound absorbing material mainly comprises a zeolite molecular sieve.

However, in the related art, the framework structure of the zeolite molecular sieve is mainly composed of silicon or silicon aluminum, which has a limited adsorption capacity for oxygen in the air, and preferentially adsorbs water vapor than oxygen, so that the zeolite or the molecular sieve exhibits a poor low frequency performance. Although the water absorption performance will be constrained in a high silica zeolite range when Si/Al>200, the effect on improving the sound quality of the speaker is limited.

Therefore, it is desired to provide new and improvement sound absorbing materials and a speaker box using the same to overcome the aforesaid problems.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be hereinafter described in detail below with reference to the attached drawings and embodiments thereof.

Figure 1:
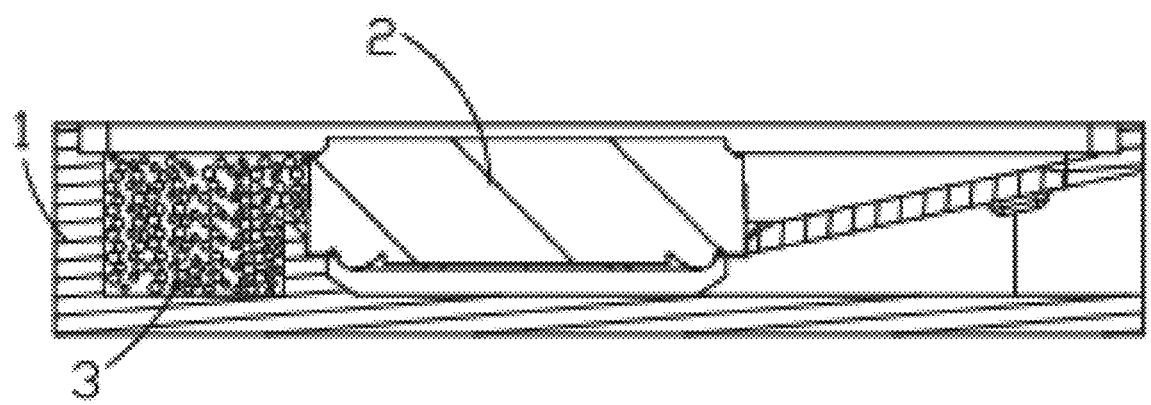
FIG. 1 is a schematic structural view of a speaker provided by the present disclosure.

Referring to FIG. 1, the present disclosure provides a speaker box 100, the speaker box 100 comprises a housing 1 having a receiving space, a speaker 2 disposed in the housing 1, and a posterior cavity 3 defined by the housing 1 and the speaker 2. The posterior cavity 3 is filled with a sound absorbing material to increase the acoustic compliance of the air in the posterior cavity, thereby improving the low frequency performance of the speaker.

The sound absorbing material comprises a heteroatom zeolite molecular sieve. The heteroatom zeolite molecular sieve comprises a framework and extra-framework cation. The framework comprises $SiO_2$ and metal oxide $M_xO_y$, comprising a metal element M, wherein the molar ratio of SUM in the framework is in the ranges of 250 to 500. Wherein the element M comprises Fe, and the extra-framework cation is at least one of a monovalent copper ion, a monovalent silver ion, a monovalent gold ion, an alkali metal ion or an alkaline earth metal ion.

Specifically, the framework of the heteroatom zeolite molecular sieve comprises $SiO_2$, which has a plurality of uniform micro-pores capable of absorbing and desorbing air molecules under the action of sound pressure to increase the volume of the virtual acoustic cavity, when the material is filled into the posterior cavity of the speaker box, and the low-frequency effect of the speaker can be significantly improved, thereby improving the low-frequency acoustic performance. The metal oxide $M_xO_y$ acts as a part of a framework, and the molar ratio of SUM in the framework is in the ranges of 250 to 500. The sound absorbing material made of the heteroatom zeolite molecular sieve of the above structure has more excellent oxygen adsorption capacity, good water repellency and stability.

The element M further comprises at least one of titanium (Ti), zirconium (Zr), tin (Sn), copper (Cu), and gallium (Ga), and does not affect the effects of the present disclosure. Compared with the conventional silica-alumina atomic zeolite, the hetero atomic zeolite molecular sieve has more excellent water repellency, which will greatly weaken the preferential adsorption of water vapor by the sound absorbing material, improve the sound absorbing effect of the sound absorbing material in the speaker box, and exhibit better performance of moisture resistance.

The molecular structure of the heteroatom zeolite molecular sieve comprises at least one of MFI, MEL, FER, BEA, and MTW. In this embodiment, the molecular sieve may be a pure phase MFI structure molecular sieve, due to the purity of the pure phase molecular sieve is high, and the speaker box filled with the MFI structure molecular sieve in the posterior cavity has better acoustic performance in the low-frequency range. Of course, the molecular sieve can also be an MFI structure molecular sieve containing other miscellaneous phases such as MEL, BEA, etc., without affecting the effect of the present disclosure, and the combination form is not limited thereto.

In this embodiment, the hetero atom zeolite molecular sieve comprises extra-framework cation, so that the heteroatom zeolite molecular sieve can more effectively adsorb and desorb the gas in the cavity, thereby better improved the low frequency performance.

The extra-framework cation is formed by cation exchange between the hetero atom zeolite molecular sieve and a salt compound. The heteroatom zeolite molecular sieve after undergoing cation exchange has excellent heat resistance and aging stability, and is suitable for improving low frequency performance of the speaker box in different environments and for a long period of time.

The hetero atom zeolite molecular sieve has a particle size of 0.1 to 10 μm, preferably 0.2 to 5 μm.

The hetero atomic zeolite molecular sieve is adhesively formed into a molded particle by adding an adhesive, and the molded particle has a particle size of 10 to 1000 μm, preferably 50 to 500 μm.

Specifically, the adhesive may be an inorganic adhesive or an organic polymer adhesive. The inorganic adhesive mainly includes activated alumina, silica sol, etc., and the organic polymer adhesive mainly includes acrylates, epoxys, polyurethanes and the like.

Embodiments of the present disclosure are explained below in conjunction with specific embodiments.

Example 1

Figure 2:
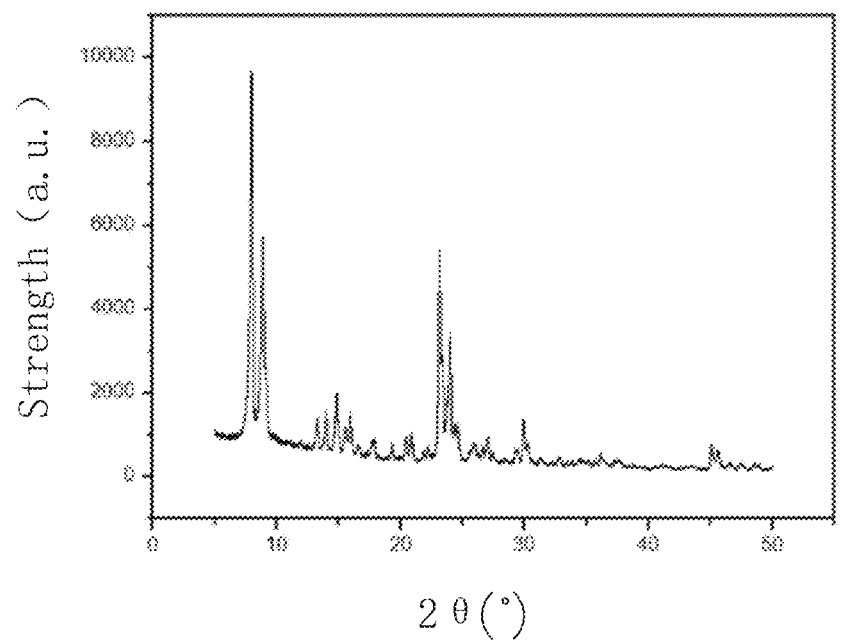
FIG. 2 is an XRD spectrum of the zeolite prepared in Example 1.
Figure 3:
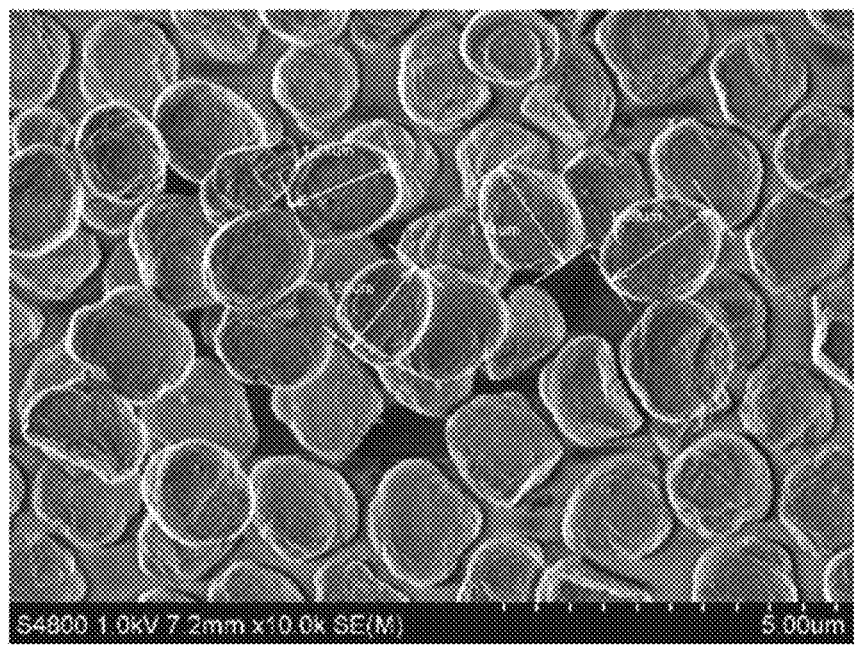
FIG. 3 is a SEM topographical view of the zeolite prepared in Example 1.

The sound absorbing material of this example comprises an MFI structure molecular sieve, and the preparation method is as follows:

Using a silicon source (including tetraethyl orthosilicate, silica sol, sodium silicate, etc.), an iron source (including ferric chloride, ferric nitrate, ferric sulfate, etc.), an alkali source (including sodium hydroxide, potassium hydroxide, hydroxide Lithium and organic base), a templating agent (including one of tetrapropylammonium bromide, tetrapropylammonium hydroxide, tetrapropylammonium chloride, tetrapropylammonium iodide, n-hexylamine, ethylenediamine and n-butylamine) and water were used as raw materials and provided with a molar ratio Si/Fe=400 to prepare an MFI structure zeolite. After the raw materials were stirred and mixed, they were crystallized at a high temperature for 7 days to obtain a sample of hetero atom zeolite molecular sieve. The XRD pattern is shown in FIG. 2. It can be seen from FIG. 2 that the prepared molecular sieve is a typical MFI structure, and the molar ratio of the Si/Fe atoms is 387; the SEM spectrum thereof is shown in FIG. 3, and it can be seen from FIG. 3 that the particle size thereof is 1.0 to 3.0 μm.

Embodiment 2

Figure 4:
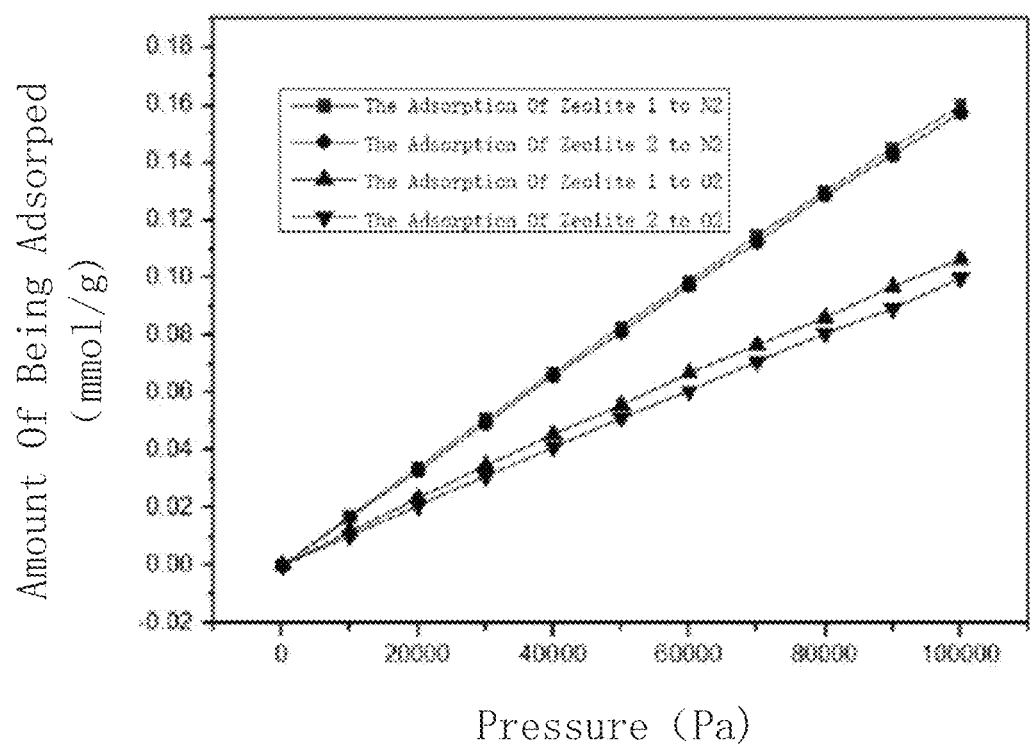
FIG. 4 is a graph comparing the air adsorption capacity of the heteroatom zeolite molecular sieve in Example 2 and that of a conventional silicalite-alumina zeolite.

The sound absorbing material of the present example comprises an MFI molecular sieve, and the preparation method thereof is as follows:

The material zeolite is a heteroatom zeolite molecular sieve material having iron element as a hetero atom and a molecular structure of MFI, and the synthetic raw material ratio Si/Fe=400. The material zeolite 2 is a conventional silica-alumina ZSM-5 zeolite molecular sieve, and the synthetic raw material ratio Si/Al=400. The atmospheric nitrogen and oxygen adsorption capacity of the zeolite molecular sieve material was measured using a Microscopy ASAP 2020 adsorber. The adsorption test results are shown in FIG. 4. Obviously, the hetero atomic zeolite molecular sieve has more excellent air absorption capacity, especially oxygen adsorption capacity; this will make the material more effective in improving the sound of the speaker box.

Example 3

The sound absorbing material of the present example includes molecular sieves having different Si/Fe molar ratios.

The preparation method thereof is as shown in Example 1. Zeolite materials (i.e., sound absorbing materials) of different Si/Fe ratios were prepared, and the actual Si/Fe atomic molar ratios were analyzed using the XRF element for comparison. The materials were filled in the posterior cavity of a speaker box for examining their respective effect on improving the low-frequency performance of the speaker box. The acoustic performance of the samples with different atomic ratios is shown in Table 1. The volume of the tool posterior cavity for acoustic performance measurement is 1 cubic centimeter (1 cc for short). It can be seen from the test data that the resonance frequency of the speaker box is relatively high when the molar ratio of Si/Fe atoms is too high or too low, which is not conducive to improving the low-frequency performance of the speaker box by the heteroatom zeolite molecular sieve.

TABLE 1

F0 values of the acoustic performance of the sound absorbing material samples with different atomic ratios

|  | Zeolite 3 | Zeolite 4 | Zeolite 5 | Zeolite 6 | Zeolite 7 | Zeolite 8 |
| --- | --- | --- | --- | --- | --- | --- |
| Si/Fe ratio of the synthetic raw materials | 200 | 350 | 400 | 500 | 600 | 800 |
| Actual Si/Fe ratio | 221 | 331 | 387 | 472 | 616 | 828 |
| Resonance frequency F0 of the speaker box | 787 | 761 | 750 | 771 | 779 | 792 |

Example 4

When a zeolite molecular sieve is used to improve the sound quality of the low frequency band of a speaker box, it will preferentially adsorb water vapor, thus weakening the adsorption capacity of air and reducing the effect in improving low frequency performance. One conventional method of reducing the preferential adsorption capacity of water vapor by the zeolite molecular sieves is to increase the ratio of Si/Al in the aluminosilicate zeolite framework. However, an excessively high Si/Al ratio is disadvantageous for the zeolite molecular sieve material to improve the low frequency effect of the speaker box. Also, the preparation of a high silicon aluminum ratio zeolite molecular sieve is costly. In a non-limiting embodiment, a heteroatom zeolite molecular sieve having a heteroatom selected from at least one of iron (Fe), titanium (Ti), zirconium (Zr), and tin (Sn) was prepared, with the raw materials for synthesis having a Si/M ratio of 400. The hydrophobicity of the heteroatom zeolite molecular sieve and the conventional aluminosilicate zeolite molecular sieve was compared by measuring their isothermal adsorption of n-hexane and water. The test method for adsorption can be obtained from the "gravimetric" test standard. The measurement results are shown in Table 2, wherein K represents n-hexane adsorption amount/water adsorption amount, which can indicate the water repellency of the material. Comparing the measurement data, it can be seen that the K value of the conventional silica-alumina zeolite is 10.95, and the K values of the heteroatom zeolites are all high than the former, indicating that heteroatom zeolites have superior water repellency. This will weaken the material's preferential adsorption on water vapor, enhance its adsorption capacity of air, and help to improve the water resistance of the speaker box with improved low-frequency performance.

TABLE 2

Experimental results on the adsorption performance of the sound absorbing material of the prior art and the sound absorbing materials of the present disclosure

|  | Traditional silica-alumina zeolite Zeolite 9 | Heteroatom zeolite molecular sieve | | | |
|---|---|---|---|---|---|
|  |  | Zeolite 10 | Zeolite 11 | Zeolite 12 | Zeolite 13 |
| Heteroatom | (Al) | Fe | Ti | Zr | Sn |
| n-hexane adsorption amount (%) | 11.5 | 12.9 | 11.2 | 9.3 | 11.8 |
| Water adsorption amount (%) | 1.05 | 1.05 | 0.72 | 0.62 | 0.84 |
| K | 10.95 | 12.29 | 15.56 | 15.00 | 14.05 |

Example 5

A small amount of cations were introduced into the heteroatom zeolite molecular sieve framework by ion exchange. While potassium salt was used for exchange, the ion is not limited to the potassium salt, and may be one or more of a monovalent copper ion, a monovalent silver ion, a monovalent gold ion, an alkali metal ion or an alkaline earth metal ion. In a non-limiting embodiment, the potassium salt used is potassium nitrate; however, the use of other potassium salts of the same type, such as potassium chloride, potassium sulfate, potassium carbonate, potassium phosphate, and the like, will also be apparent to those skilled in the art. The performance of the heteroatom zeolite molecular sieve (Zeolite 14) after undergoing cation exchange and the performance of the heteroatom zeolite molecular sieve (Zeolite 15) to which a small amount of cations were not introduced by ion exchange is as shown in Table 3. In both cases, the ratio of Si/Fe in the raw materials for synthesis is 400. From the data in the table, it can be concluded that when the cavity of the speaker box was filled with the heteroatom zeolite molecular sieve to which a small amount of cations were introduced by ion exchange, the resonance frequency of the speaker box can still be kept at a low level after being used in high temperature for a long period of time. This indicates that the introduction of a small amount of cations enables the heteroatom zeolite molecular sieve to have better heat resistance and aging stability.

TABLE 3

Resonance frequencies F0 and Q before and after adding the molecular sieves to the rear chamber of the speaker box

|  | Initial | | High temperature for 72 h | | High temperature for 120 h | |
|---|---|---|---|---|---|---|
|  | F0 | Q | F0 | Q | F0 | Q |
| Zeolite 14 | 748 | 0.98 | 769 | 1.03 | 771 | 1.08 |
| Zeolite 15 | 755 | 1.05 | 789 | 1.13 | 803 | 1.18 |

Compared with the related art, the sound absorbing material of the present disclosure is a heteroatom molecular sieve based on a silica-based zeolite molecular sieve. The heteroatom zeolite molecular sieve comprises a framework and extra-framework cations. The framework comprises $SiO_2$ and a metal oxide $M_xO_y$, containing a metal element M. The framework has a Si/M molar ratio of 250 to 500, wherein M includes Fe. This results in a heteroatom zeolite molecular sieve which replaces the silicon atom in a conventional zeolite with an iron atom. Such a structure enables the sound absorbing material to have better oxygen adsorption capacity, good water repellency and stability. When such a sound absorbing material applied to a speaker box, the speaker box will have better low frequency acoustic performance and better reliability.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sound absorbing material comprising a heteroatom zeolite molecular sieve comprising a framework and an extra-framework cation, the framework comprising $SiO_2$ and a metal oxide $M_xO_y$, comprising a metal element M, wherein the framework has a Si/M molar ratio of 250 to 500, wherein the M includes Fe, and that the extra-framework cation is at least one of a monovalent copper ion, a monovalent silver ion, or a monovalent gold ion.

2. The sound absorbing material according to claim 1, wherein the M further comprises at least one of titanium, zirconium, tin, copper, and gallium.

3. The sound absorbing material according to claim 1, wherein the heteroatom zeolite molecular sieve has a molecular structure of at least one of MFI, MEL, FER, BEA, and MTW.

4. The sound absorbing material according to claim 1, wherein the extra-framework cation is formed by cation exchange between the heteroatom zeolite molecular sieve and a salt compound.

5. The sound absorbing material according to claim 1, wherein the heteroatom zeolite molecular sieve has a particle size of 0.1 to 10 μm.

6. The sound absorbing material according to claim 5, wherein the heteroatom zeolite molecular sieve has a particle size of 0.2 to 5 μm.

7. The sound absorbing material according to claim 1, wherein the heteroatom zeolite molecular sieve is formed into shaped particles through the addition of an adhesive, and the shaped particles have a particle size of 10 to 1000 μm.

8. The sound absorbing material according to claim 7, wherein the shaped particles have a particle size of 50 to 500 μm.

9. The sound absorbing material according to claim 7, wherein the adhesive is one of an inorganic adhesive or an organic polymer adhesive.

10. A speaker box comprising a housing having a receiving space, a speaker disposed within the housing, and a posterior cavity defined by the speaker and the housing, wherein the posterior cavity is filled with the sound absorbing material according to the claim 1.

* * * * *